(12) United States Patent  (10) Patent No.: US 6,969,939 B1
Swensrud et al.  (45) Date of Patent: Nov. 29, 2005

(54) BOLTED CONNECTOR FOR ELECTRICAL EQUIPMENT

(75) Inventors: Roger Lee Swensrud, Plum, PA (US); Jeffrey Robert Repp, Export, PA (US); Ernest Stanislaus Ortoli, Pittsburgh, PA (US); Robert Edward Strickler, Plum, PA (US); J. Franklin Roach, Oakmont, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 100 days.

(21) Appl. No.: 10/658,504

(22) Filed: Sep. 8, 2003

(51) Int. Cl.$^7$ .......................................... H02K 17/00
(52) U.S. Cl. ...................................... 310/201; 310/208
(58) Field of Search ............................. 310/201, 208, 310/260, 270

(56) References Cited

U.S. PATENT DOCUMENTS

| | | | |
|---|---|---|---|
| 1,276,085 A | 8/1918 | Pontois | 310/112 |
| 2,428,570 A | 10/1947 | Jones | 310/13 |
| 3,212,046 A | 10/1965 | Abel et al. | 439/502 |
| 3,806,767 A | 4/1974 | Lehrfeld | 361/803 |
| 3,859,549 A | 1/1975 | Boesel | 310/218 |
| 4,056,880 A | 11/1977 | Stewart | 29/596 |
| 4,078,150 A | 3/1978 | Daugherty et al. | 174/558 H |
| 4,172,243 A | 10/1979 | Daugherty et al. | 336/60 |
| 4,172,984 A | 10/1979 | Daugherty et al. | 310/71 |
| 4,199,700 A | 4/1980 | Daugherty et al. | 310/71 |
| 4,380,362 A | 4/1983 | Swensrud et al. | 339/112 L |
| 4,594,522 A | 6/1986 | Fujiwara et al. | 310/42 |
| 4,627,680 A | 12/1986 | Weimer et al. | 339/22 B |
| 4,635,350 A * | 1/1987 | Olsen et al. | 29/598 |
| 4,638,199 A | 1/1987 | Brem et al. | 310/91 |
| 4,806,807 A | 2/1989 | Levino | 310/260 |
| 4,894,575 A | 1/1990 | Nilsson et al. | 310/260 |
| 4,912,831 A | 4/1990 | Levino | 29/596 |
| 5,261,830 A | 11/1993 | Jego et al. | 439/210 |
| 5,270,598 A | 12/1993 | Holly, III et al. | 310/71 |
| 5,355,046 A | 10/1994 | Weigelt | 310/260 |
| 5,789,840 A | 8/1998 | Gould et al. | 310/179 |
| 6,355,993 B1 * | 3/2002 | Hazelton et al. | 310/12 |
| 6,373,153 B1 * | 4/2002 | Hazelton et al. | 310/12 |
| 6,373,165 B1 | 4/2002 | Rowe | 310/260 |
| 6,486,575 B2 * | 11/2002 | Miller | 310/43 |

* cited by examiner

*Primary Examiner*—Darren Schuberg
*Assistant Examiner*—Nguyen Hanh
(74) *Attorney, Agent, or Firm*—Reed Smith LLP

(57) ABSTRACT

The present invention provides a mechanical-electrical connector for interconnecting two separate circuits, as in two separate stator coil sections. The conductive end pieces of the stator coil sections to be interconnected are machined such that they can be inserted into the connector. The connector provides alternating conductive and dielectric layers to connect successive stator sections in an easy-to-assemble, non-permanent mechanism. A series of external jumper conductors provide interconnection between the internal conductive layers.

18 Claims, 11 Drawing Sheets

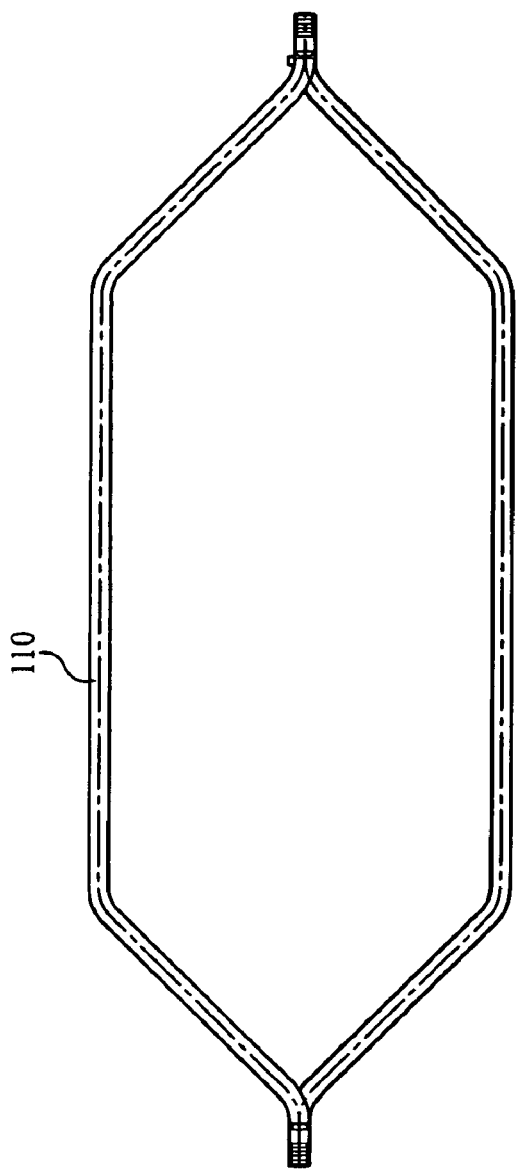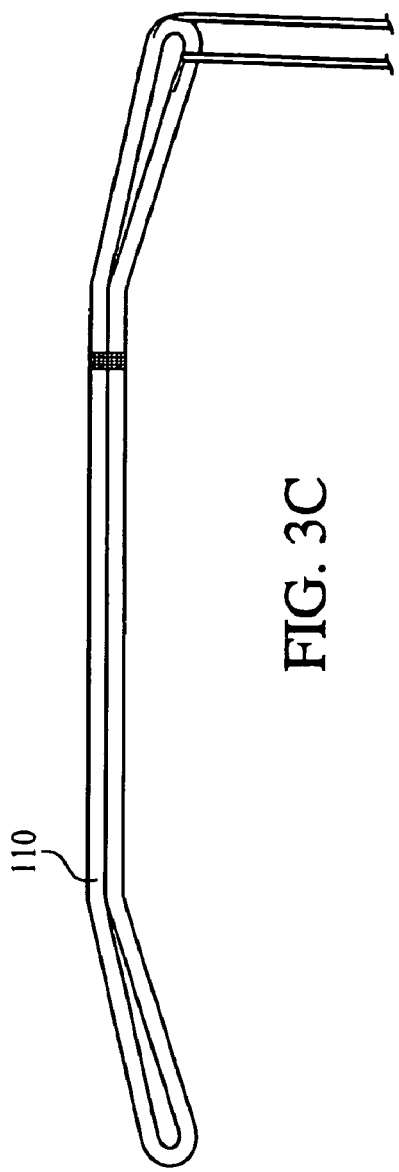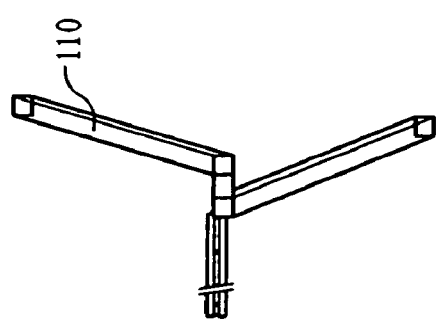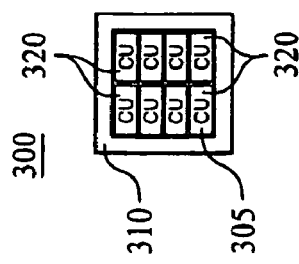

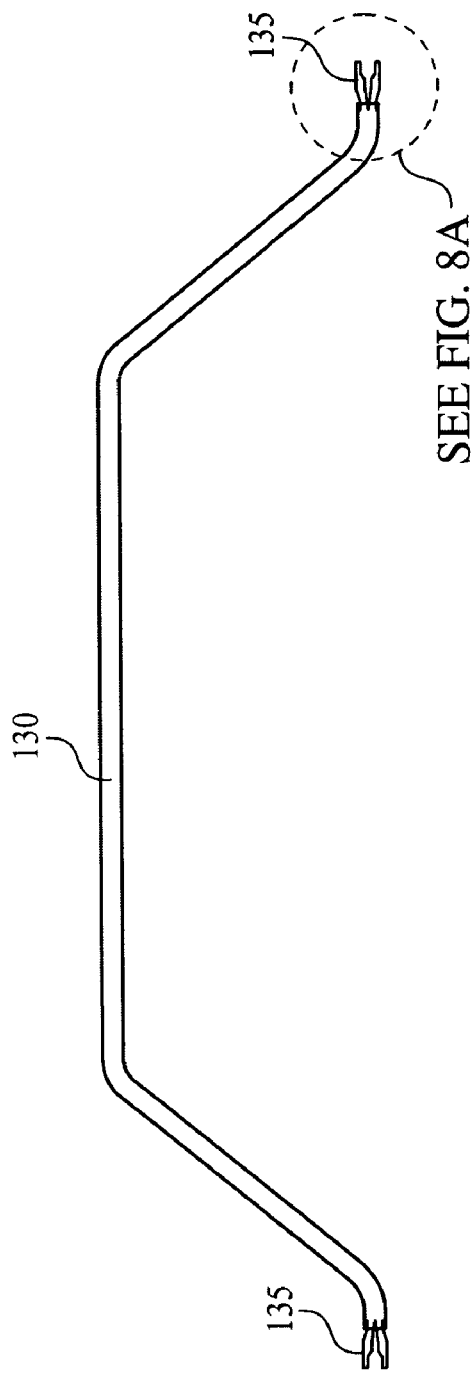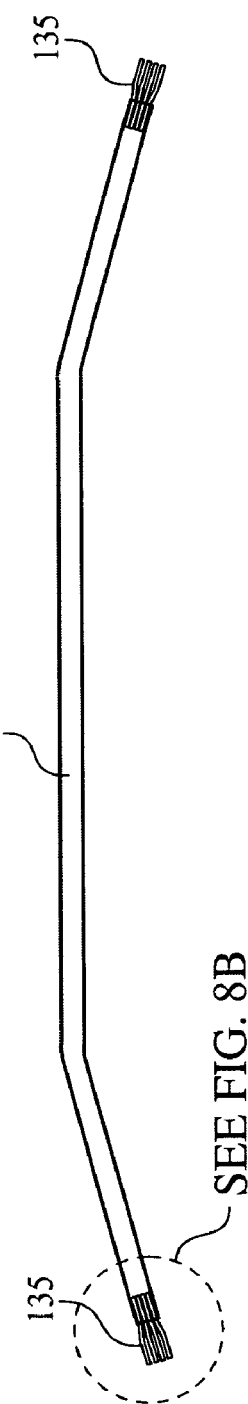

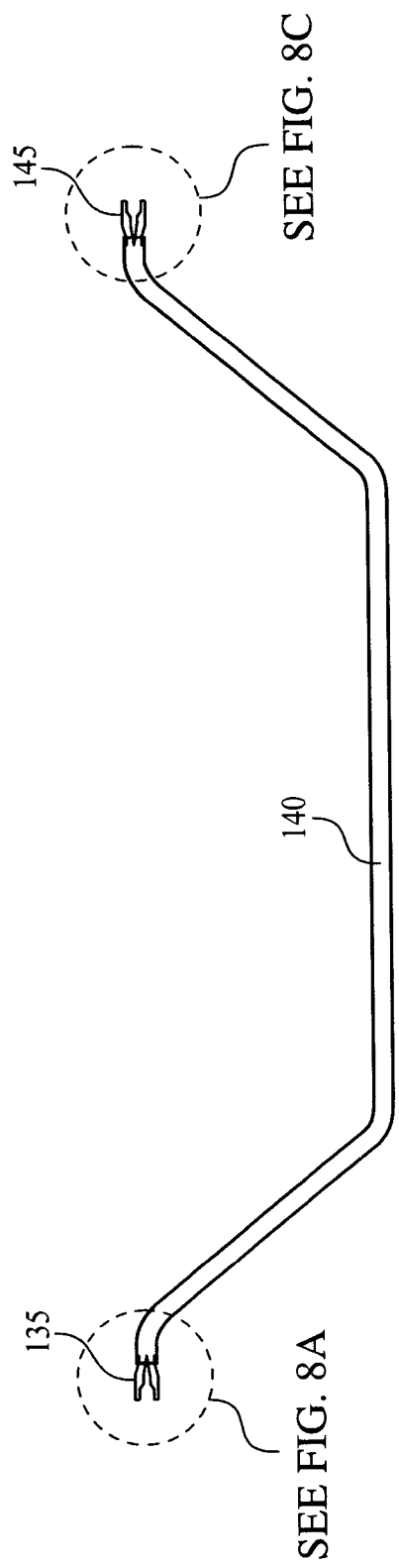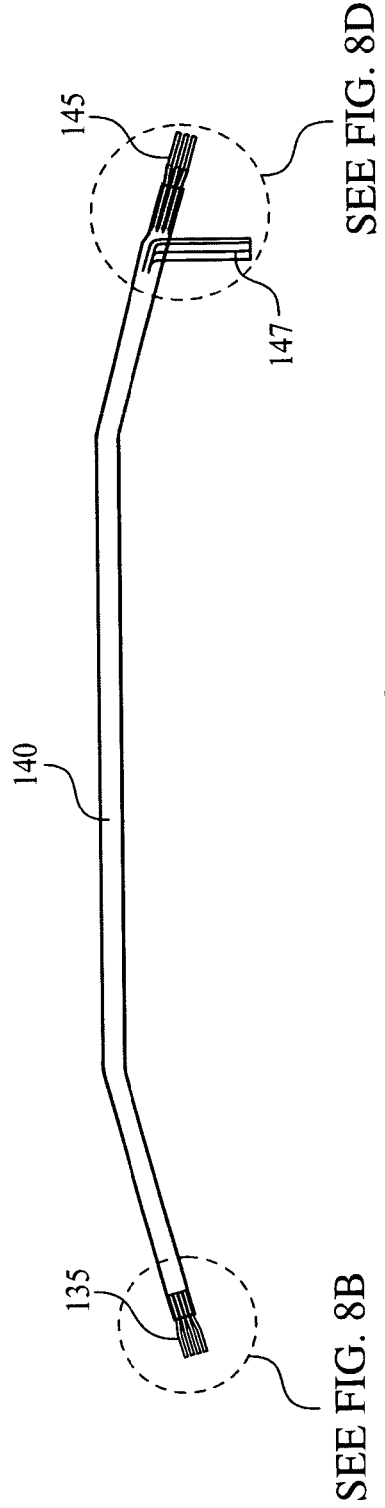
FIG. 6A
FIG. 6B

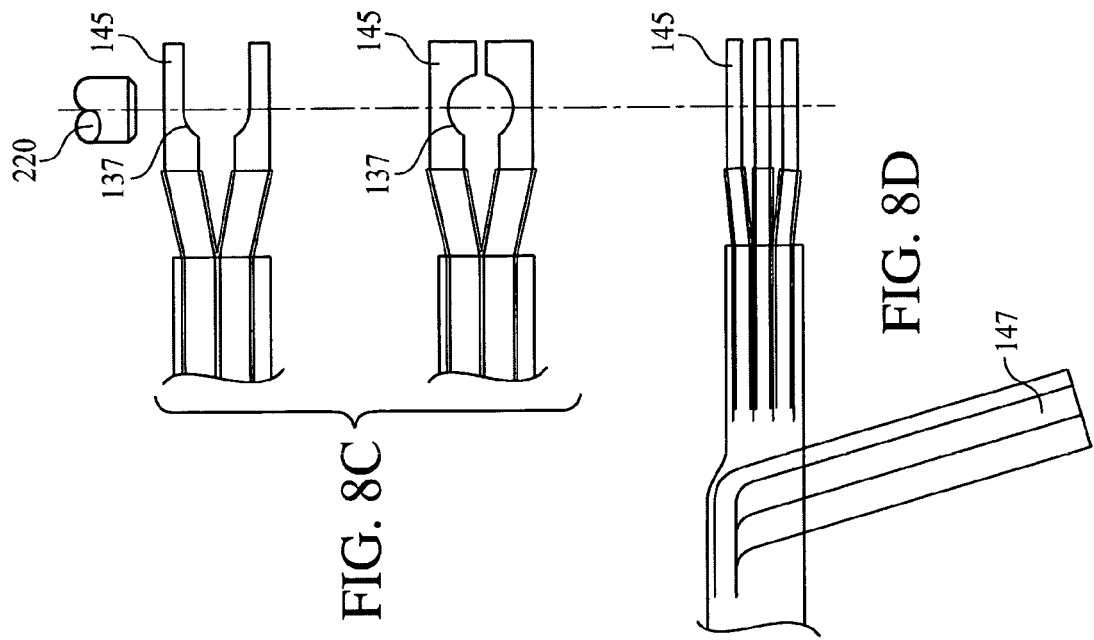
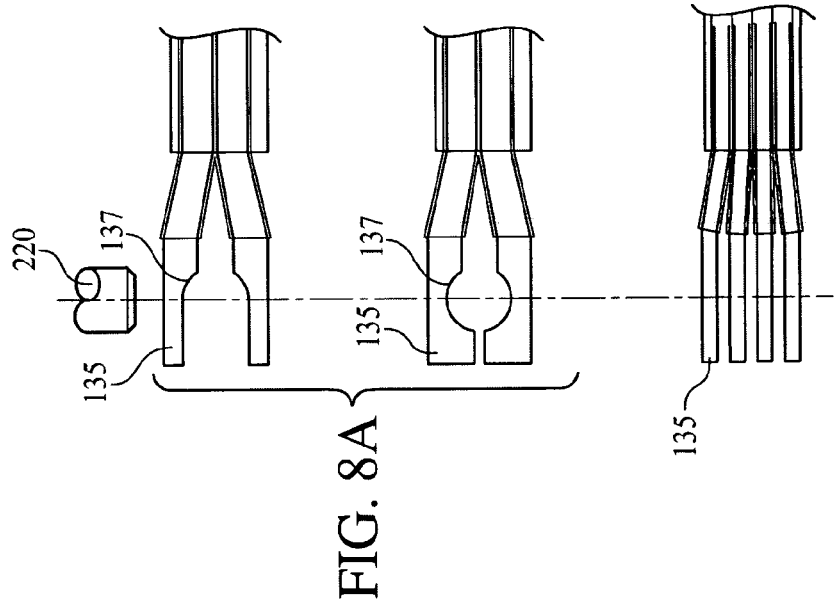

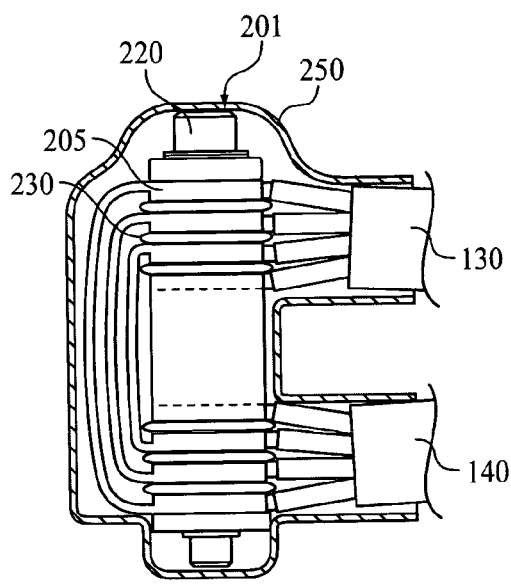
FIG. 12A
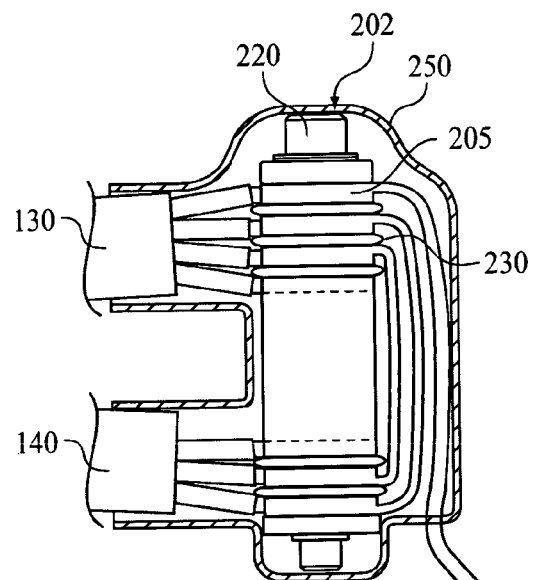
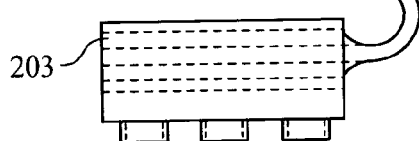
FIG. 12B
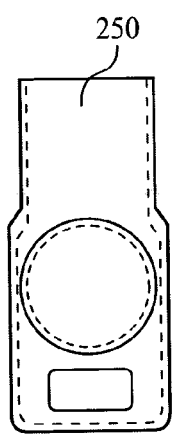
FIG. 12C
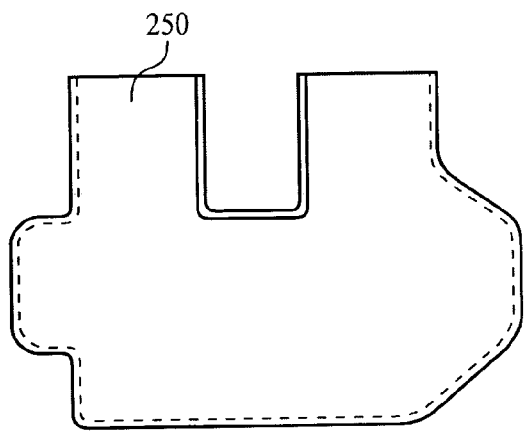
FIG. 12D
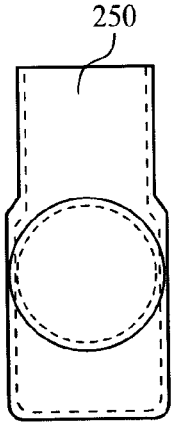
FIG. 12E

BOLTED CONNECTOR FOR ELECTRICAL EQUIPMENT

BACKGROUND OF THE INVENTION

1. Field of the Invention

The present invention relates generally to mechanical-electrical connectors, and, more specifically, the present invention relates to a bolted mechanical connector for continuously wound electrical machines.

2. Description of the Background

Electrical machines such as generators and motors (collectively "machines") basically consist of current-carrying electrical conductors assembled in slots in iron cores. To construct a practical machine, these electrical conductors must be connected together or "networked" to form functional electric circuits. The interconnection of segments of these electrical circuits may take on many different forms.

Typically, small to medium-sized machines use simple crimp-type hardware, brazing, or soldered joints to produce the connections required to form the circuits. These are relatively simple joint problems which are solved with a permanent or semi-permanent joint solution.

Generally speaking, the required complexity of the conductors, circuits, and connections are determined by the type, size, or rating of the particular motor or generator. Essentially, the larger the machine, the more complex the joint configuration and the conductor system geometry become. For example, as the size of the machine increases, the individual slot conductor, referred to here as a conductor bar, becomes a system of several individually insulated conductor strands in parallel within the single conductor bar.

FIG. 4 depicts a typical conductor bar 300 with eight individual insulated conductors 305 surrounded by an orientation would be used to form four "conductor-pairs" 320 (each one represented by a row in FIG. 4), that may each be at the same or a different electrical potential. The increased conductor complexity of these larger machines generates requirements for a more complicated connector to maintain the integrity of separations of the individual insulated strands within each conductor bar.

Small machines with round, single-piece stator cores utilize electrical conductor circuit connectors that reside within a single one-piece stator. Most, if not all electrical connections can be, and are traditionally, made in the factory. However, larger continuously wound electrical machines, like "water wheel generators" and long linear motors, are fabricated in and transported from the factory to the field erection site (or any site at which they are subsequently put together) in several segments or sections. The largest or longest length that can be transported (often determined by truck size or load weight limitations) will determine the length or size of each stator section. Longer, larger motors require a greater number of sections. As described in more detail below and as used as an exemplary machine for which to describe the present invention, FIGS. 1 and 2 depict a two-section stator continuously wound linear motor with required interconnections both before (FIG. 1) and after assembly, before electrical connection (FIG. 2).

This type of motor interface requires reliable, efficient conductor connections between each conductor of each successive stator section made at the assembly installation site. In all machines, efficient electrical joint design is required. This design effort entails maximizing the efficiency of the use of available space by minimizing the size of the connector. The connector design must include features to minimize the size, weight, and installation time.

As a partial solution, in applications not requiring ease of maintainability, minimization of field assembly time, or rapid "spare section" replacement, the electrical connection between successive stator conductors can be accomplished by making the circuit connections using weld, braze, or solder metals joining, followed by applying the required strand and outer insulation by hand. A second method sometimes used is to "bridge the interface" between sections by shipping the sections with empty slots adjacent to the section-to-section interfaces and filling these slots with field-wound full diamond coils. This method also requires "scarce craft skills" (expert knowledge and training) to wind the coils in the empty slots and complete the other required connection tasks.

Both of these traditional methods suffer from undesired characteristics including: limited maintainability, complicated refurbishment of spare part replacement, and required scarce craft skills to perform the connection work. Reliability of work performed out of the factory environment can also add unknown risks to equipment performance.

As such, there is a need in the art to provide a mechanical-electrical connector for these large, multi-sectioned stator machines that facilitates ease of assembly and replacement at the installation site, while meeting the desired electrical and mechanical specifications set forth for the machine. The present invention, in at least one preferred embodiment, addresses one or more of the above-described and other limitations to prior art systems.

SUMMARY OF THE INVENTION

In accordance with at least one preferred embodiment, the present invention provides a mechanical-assembled fastener capable of providing multiple-circuit electrical connections. The connector is preferably designed to occupy minimum physical space while maintaining electrical circuit integrity when joining multiple electrical circuits in applications requiring the splicing of current-carrying electrical conductors (round, rectangular, hollow, etc.) in electrical machines (stationary, rotating, linear, etc.).

In one exemplary embodiment, the connector is used as part of a long linear motor comprised of wound sections that require connection between end coils bridging adjacent sections. The end pieces of the main coil sections (half-diamond sections) are machined to easily accept the electrical-mechanical connector. The connector provides a mechanical and electrical connection between the conductors of the main coil sections while maintaining designed operating conditions.

The present invention preferably provides efficient assembly, disassembly, and maintenance of electrical machinery without the use of "semi-permanent" welded, brazed, soldered, riveted, and similar metals joining processes. The mechanical-electrical connector also facilitates connection of multiple electrical circuits using a single fastener and maintains electrical strike and creep integrity between electrical circuits of different potentials, as in a series coil. The connector also preferably minimizes physical space required to make single multi-strand connections and allows for the incorporation of electrical Roebel transposition within the connector.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 3 shows a front (3A), top (3B) and side (3C) view of a conventional formed full-diamond coil;

FIG. 4 details a cross-section of a multi-conductor coil;

FIG. 5 depicts a top (5A) and side (5B) view of a formed upper half-diamond coil;

FIG. 6 depicts a top (6A) and side (6B) view of a formed lower half-diamond coil;

FIG. 8 is an exploded view of exemplary coil end geometries for bolted series electrical connectors, including top (8A) and side (8B) views of a four conductor connector, and top (8C) and side (8D) views of a three conductor connector with phase lead;

FIG. 12 shows the assembled bolted series connector with insulating boots, including internal side views (12A–12B) and external bottom (12C), side (12D) and top (12E) views.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

As briefly described above, in various types of wound synchronous machines, the stator consists of a continuously wound conductor (or conductors) throughout the machine. In the case of a round machine, the stator loops are completely continuous, and in the case of a linear motor, the stator loops travel from one end of the machine to the other along the main axis.

In most of these synchronous machines, the entire stator is manufactured as one single piece. However, in extremely large machines, the stator may need to be pieced or sectioned in order to transport the machine to its installation site (or for feasibility of manufacturing). For example, large linear motors and large water wheel-type round motors may require the stator to be sectioned. Upon installation, therefore, some mechanical and electrical connection must be implemented at each interconnection point between successive stator sections.

Figure 1:
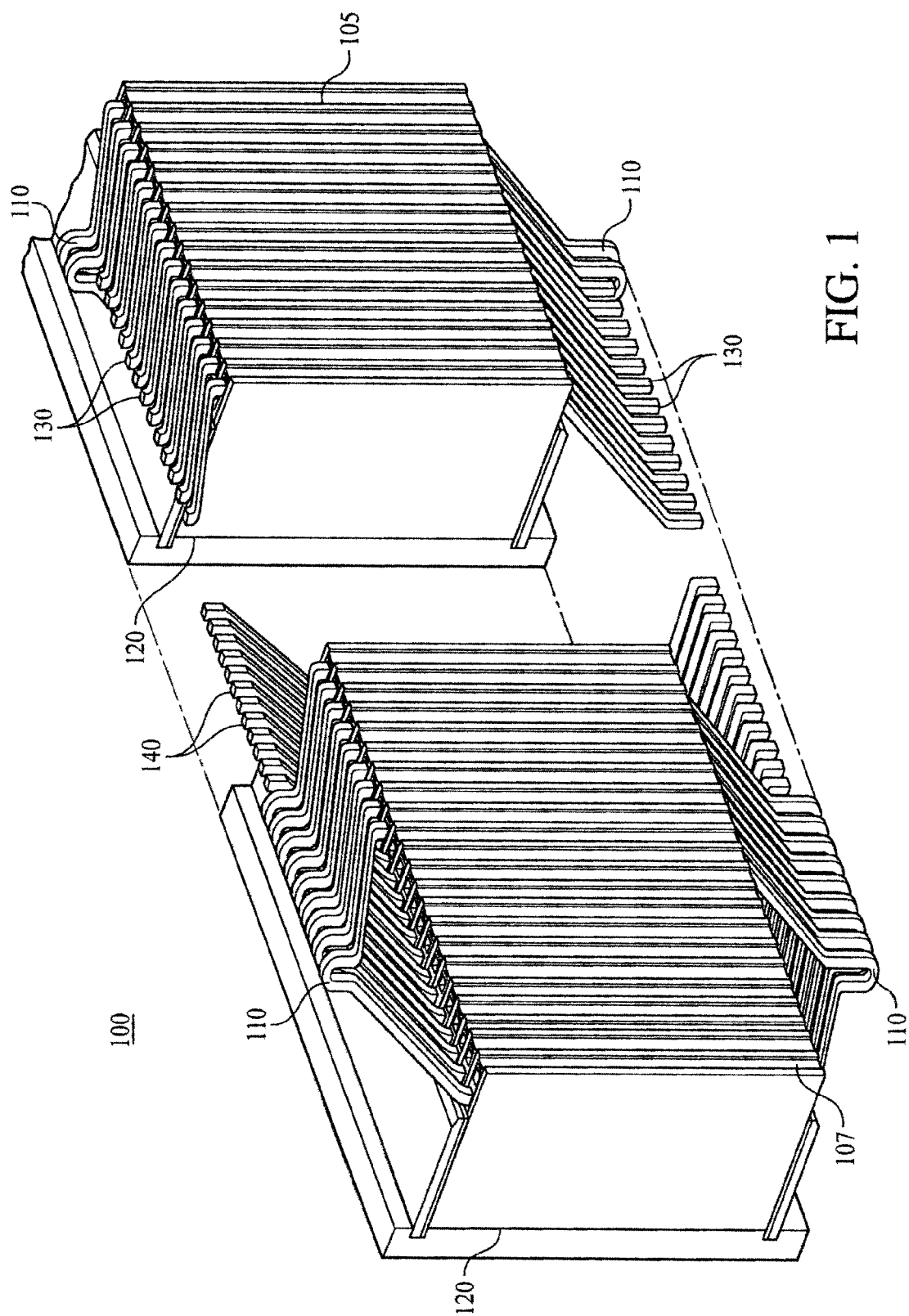
FIG. 1 depicts a two-section linear motor interface before assembly.

The longest length of an individual electrical motor (or generator) stator section that can be transported typically determines the maximum practical factory-manufactured length of each individual stator section. These large stator sections are then field-assembled into a complete electrical machine. The conductors within the stator sections must be electrically connected together at the assembly site while maintaining the desired electrical and mechanical characteristics of the machine. A typical assembly of two of large stator sections is depicted in FIG. 1 (before assembly) and FIG. 2 (after assembly, before electrical connection). This assembly process produces a continuously wound linear motor after field installation (or assembly at any location) of some electrical and mechanical connector at the points at which the two stator sections meet.

In FIG. 1, two stator sections (first stator section 105 and second stator section 107) of a linear motor 100 are shown separated before installation. The stator in this particular linear motor 100 is made up of conductive loops commonly referred to as formed full-diamond coils 110 (see FIG. 3). As shown in more detail in FIG. 3B, this name derives from the diamond shape of the loops 110 when viewed from above.

In the present exemplary linear motor 100, each of these full-diamond coils 110 includes four pairs of conductors (see FIG. 4, a cross-section of the coil). As described in more detail below, the conductors within the full-diamond coil 110 may be oriented in series such that current flows into the full-diamond coil 110 through one conductor pair, makes four complete loops around the full-diamond coil, and finally exits the full-diamond coil through another conductor-pair (to enter the next adjacent full-diamond coil). Each "row" 320 of two conductors 305 shown in FIG. 4 would be at the same potential, and successive rows 320 would be wound in successive loops around the coil 110 (and would be at different potentials). A plurality of these full-diamond coils 110 are arranged successively down the long axis of the linear motor 100 with the entry and exit conductor pairs connected to each other such that the plurality of full-diamond coils form a continuous series of loops, or a continuous coil down the length of the linear motor. This stator orientation is common in the art.

A problem arises, however, when the linear motor 100 (or large round motor) must be sectioned before installation because these continuous loops are interrupted at the joints between successive stator sections 105, 107. Further, this problem is aggravated when, as in the present example, each of the full-diamond coils 110 is comprised of multiple conductors, as with the four conductor-pairs shown in FIG. 4.

In order to fabricate a sectioned stator as in FIG. 1, the full-diamond coils 110 must be specially fabricated to allow for eventual combination with successive stator sections at installation. The first stator section 105 is fabricated by laying successive full-diamond coils 110 (FIG. 3) next to each other, from right to left in FIG. 1, according to conventional practices. These full-diamond coils 110 are wound into the stator core 120, connected to each other, and vacuum impregnated with resin prior to leaving the factory to maximize insulation between conductors.

However, when the section interface between the first 105 and second 107 stator sections is encountered, the bottom slots in the stator core 120 are no longer available in which to place full-diamond coils 110. In other words, because of the angle at which the full-diamond coils 110 sit in the stator core 120, these last few coil slots in the first stator section 105 can only accommodate the upper portion (opposite the stator core 120) of a full-diamond coil 110. The balance of the upper slots in the first stator section 105, therefore, are filled with specially designed "upper half-diamond coils" 130, similar to those shown in FIG. 5.

FIG. 5 details a top view (5A) and side view (5B) of an upper half-diamond coil 130 for use with the present invention. In short, the upper half-diamond coil 130 is fabricated to mimic the upper portion of a full-diamond coil 110 (FIG. 3) with specially designed coil ends (or tips) 135 to accommodate interconnection with a lower half-diamond coil 140 (described below). The details of these tips 135 are shown in an exploded view in FIG. 8A (top view of two exemplary tips) and FIG. 8B (side view of the same).

Because the exemplary embodiment of the stator coils includes four conductor-pairs (FIG. 4), the tips 135 of the upper half-diamond coil 130 are arranged as four paired tips. Each of these tip-pairs has a hole 137 drilled there-through (see FIG. 8A) to accommodate a bolt 220 which secures the electrical-mechanical connector to the coils (described below). The tip pairs 135 are then arranged in four vertical rows (see FIG. 8B). These tips 135 exist on both sides of the upper half-diamond coil 130.

Returning to FIG. 1, the upper half-diamond coils 130 are successively installed into the first stator section 105 next to the previously described full-diamond coils 110. The coil tips with exposed conductors extend out beyond the edge of the first stator section 105.

The fabrication of the next successive stator section (second stator section 107) proceeds in a similar fashion. To mate with these upper slot half-diamond coils 130 in the first stator section 105 (when the two stator section are moved together in FIG. 2), lower half-diamond coils 140 (see FIG. 6) are placed in the lower slots of the stator core 120 at the right side of the second stator section 107 in FIG. 1. These lower half-diamond coils 140 are fabricated to mimic the lower part of the full-diamond coil 110 shown in FIG. 3. As with the upper half-diamond coil 130, the conductor ends or tips on the left side of the lower half-diamond coil 140 are exposed and machined to form four paired conductor tips 135 (see FIGS. 8A–8B). However, it should be noted that the tip 145 on the right side of the lower half-diamond conductor 140 (see FIGS. 8C–8D) includes only three conductor-pairs. One conductor-pair 147 is left without machining so that it may be used to connect to the next successive half-diamond (or full-diamond) coil. This connection is described in more detail below.

Turning back to FIG. 1, continuing in the fabrication of the second stator section 107 from right to left, the balance of the second stator section is filled with full-diamond coils 110. At this point, there is sufficient room in both the stator core 120 and the upper portion of the stator to accommodate the full-diamond coil 110. The number of upper half-diamond coils 130 in the first stator section 105 matches the number of lower half-diamond coils 140 in the second stator section 107 to accommodate interconnection.

Figure 2:
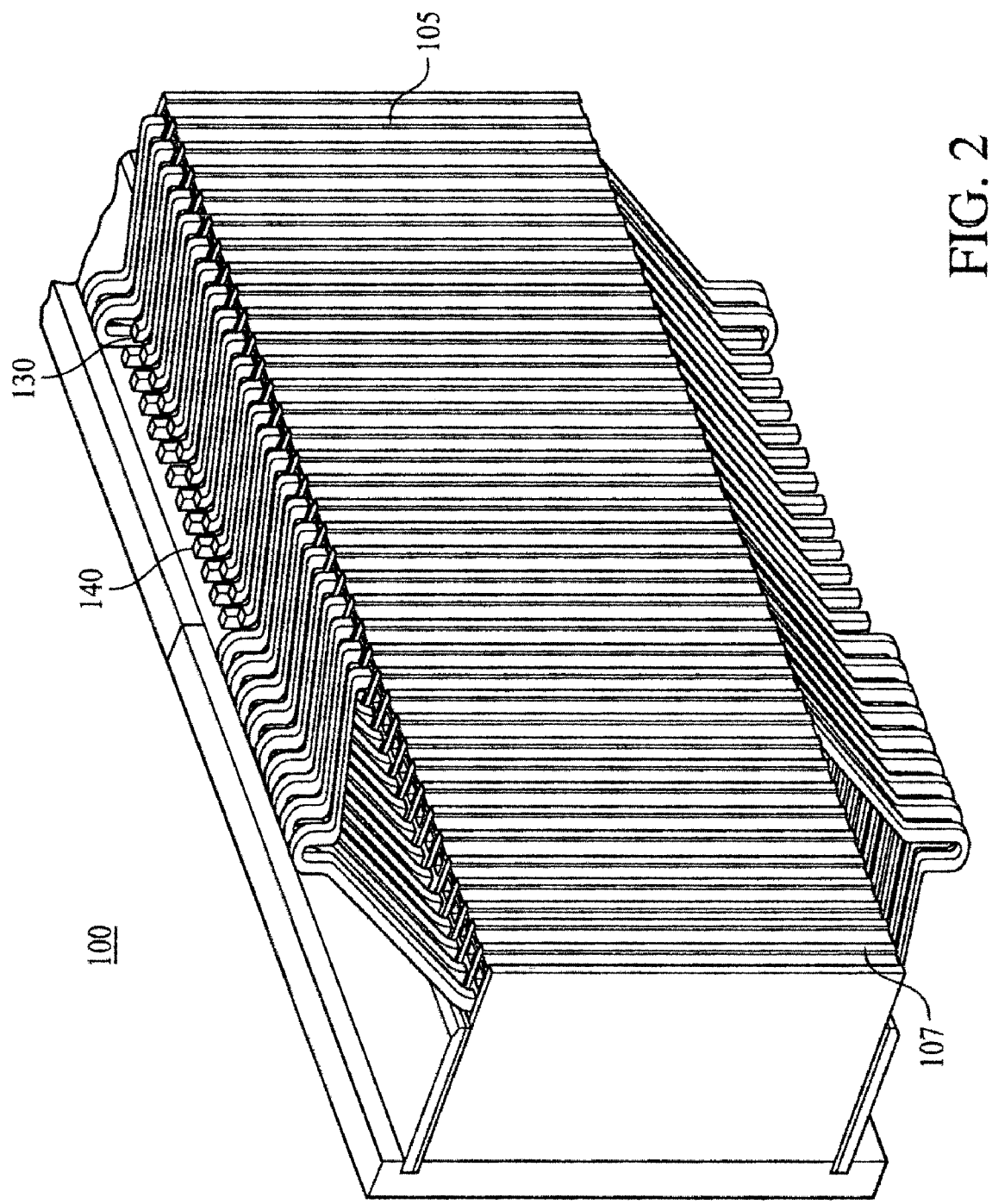
FIG. 2 depicts a two-section linear motor with both sections pushed in place next to each other.

At the installation site, these two separate first 105 and second 107 stator sections are brought together as in FIG. 2. Note that the upper 130 and lower 140 half-diamond coils (each with four conductor-pairs) are now in place next to each other. In fact, the four conductor-pairs at the tip of the upper half-diamond coil 130 and the four (or three) conductor-pairs at the tip of the lower half-diamond coil 140 should now be aligned such that a bolt 220 may be passed through the "drilled-out" hole 137 through the tips 135, 145 (see generally FIG. 8). This bolt 220 will secure the mechanical-electrical connector to the tips 135, 145 of the upper 130 and lower 140 half-diamond coils (see FIGS. 7B and 10).

The tooling of the tips 135, 145 of each of the half-diamond coils 130, 140 preferably occurs at the fabrication plant. Prior to the factory winding of each half coil 130, 140, a workstation is used to produce the tip details. Two of the many tip configurations 135, 145 available are shown in the top views of FIGS. 8A and 8C. For example, a drilled semi-circle hole 137 replacing the slot would provide a locking notch and provide positive registration of the connector strap jumpers (see FIG. 11 at 210), ensuring proper axial placement during assembly. Based on available end spacing, increasing the flaring between strands within each conductor-pair would eliminate machining the slot into the strands, allowing for inner-cooling of strands by not interfering with their internal coolant channel. An almost limitless variety of tips 135, 145 may be fabricated within the scope of this invention.

Once in place next to each other, the general goal of assembly is to connect each of these mated half-diamond coils 130, 140 with each other, for example with a series connector that provides multiple current loops within each diamond coil. As described above, in the past, the conductors of these stator sections 105, 107 might be brazed, welded or otherwise affixed in a semi-permanent or permanent fashion. While these prior methods may sufficiently interconnect the stator sections 105, 107 for use, they also promote many problems. For example, these methods require specialized tools, knowledge and training to perform the welding or other connection necessary for installation. This wastes both time and money. Second, when a stator section must be replaced or otherwise disassembled, the entire machine must be broken down by destroying the permanent or semi-permanent connections. Additionally, the various tools involved may be quite expensive or not available at some sites.

In at least one preferred embodiment, therefore, the present invention provides a device and method for connecting these successive stator sections 105, 107 to each other with an easily installed and removable connector 200 that provides sufficient usage characteristics under varied conditions. Even if the conductors within the stator are at different electrical potentials (e.g., 1–30 kV at 20–30,000 amps), the connector 200 can be designed to tolerate these harsh and varied operating conditions.

FIG. 11 details exemplary bolted series connectors 200 for use with the present invention to interconnect the upper 130 and lower 140 half-diamond coils while maintaining proper isolation between the various conductor-pairs. These connections must be made while retaining electrical isolation from each conductor-pair to all other conductor-pairs in a given half-diamond coil in the case where conductor-pairs consist of successive series turns of the coil and thus are at different voltage potentials. Specifically, FIGS. 11A–E detail multiple views of a bolted electrical connector 201 for interconnecting four conductor-pairs from each of the upper 130 and lower 140 half-diamond coils. FIGS. 11F–J details multiple views of a bolted electrical connector 202 for interconnecting four conductor-pairs from the upper half-diamond coil 130 with three conductor pairs from the lower half-diamond coil 140, with an additional phase lead interconnect jumper 203 for connection to a successive coil conductor (or machine neutral or line potentials).

The constitution of the bolted series connector 201 will be described in detail, but the description applies to the connector 202, with the difference being the phase lead 203 to interconnect to the next full diamond coil. The bolted series connector consists of an interleaved series of conductive and dielectric layers that interconnect the conductors of the upper 130 and lower 140 half-diamond coils to complete a full-diamond coil circuit. The electrical circuit connections are made from upper 130 to lower 140 half-diamond coils with machined copper jumper strap conductors 210.

Specifically, there are conductive strand layers 205 (shown through section C—C in FIG. 11C) at the location where each of the half-diamond coil tips 135 are inserted into the bolted connector 201. Each conductive layer 205 is machined (clamp area 207) to accept the profile of the tips 135 (see FIG. 11C). The outer three conductive layers 205 on the upper and lower parts of the connector 201 are electrically connected by copper jumper strap conductors 210 and the inside layer electrical connection is made through an inner layer jumper block 215. Through these conductor layers 205 and jumper straps 210, the conductors of the lower half-diamond coil 140 (attached to the bottom of connector 201, see FIG. 7B) are connected to the conductors of the upper half-diamond coil 130 (attached to the top of connector 201, see FIG. 7B). Once connectors 201, 202 are applied to each end of the upper and lower half-diamond coils (FIG. 7B), the connections mimic a conventional full-diamond coil 110 (FIG. 3).

Contact resistance controls the electrical losses and heat generated at the interfaces between these various conductive items. Silver plating of all mating copper contact surface areas limits the electrical contact resistance by inhibiting formation of high resistance surface oxides while the torque from the tightening bolt 220 minimizes resistance due to insufficient surface contact pressure.

The required insulation and resulting circuit isolation between conductive strand layers 205 is obtained by separating successive conductive layers with dielectric spacers 230. These dielectric spacers 230 (shown in detail through cross-section B—B in FIG. 11B) are sized such that they extend beyond the conductive layers 205 (see 232). The dielectric spacers may be made of a epoxy glass such as G10. Along the same lines, an insulating tube 235 and dielectric washer insulate the tightening bolt 220 and provide electrical isolation from the electrical circuit in the conductive layers 205 and jumper straps 210.

After the conductive 205 and insulating 230 layers are properly aligned to the tips 135, 145, of the upper and lower half-diamond coils, a tightening bolt 220 is run through the layers and the holes 137 in the tips to secure the connector 201, 202 together. The tightening bolt 220 load and resulting stretch is reacted by a self-locking heli-coil nut 225. The bolt stretch required to maintain low contact resistance is provided for by the correct selection of bolt material, diameter and installation torque. With proper sizing, heat-treated carbon steel, silicon bronze, and stainless steel bolt material can be used. Adequate long-term maintenance of bolt stretch is maintained by the proper sizing of the "Bellville" washer 227 located under the head of the bolt 220. Once the bolt 220, is installed, the connections are complete.

Once several connectors are installed on the stators, the insulation between successive bolted series connectors 200 and between bolted series connectors and other conductive surfaces in the machine is provided by covering or encasing each connector 200 in a molded (e.g., 0.040" thick) silicone rubber boot 250 as shown in FIG. 12. Other boot 250 materials and/or thicknesses could be used based on a particular machine's voltage rating and clearances between surfaces of different electrical potentials. The connectors 200 may be painted with an epoxy enamel before encasing them in the boot for greater insulation.

The boot 250 is preferably comprised of two mated rubber half-boots that are brought together around the connector 200 during installation. Preferably, the boot 250 is filled with a paste-like insulator or dielectric that, when cured, will further insulate the electrical conductors from each other. RTV may be included to reduce moisture. The two sections of the boot 250 may be secured to each other around the bolted electrical connector 200 using ordinary twist ties.

The connectors 200 may be built layer by layer at the installation site and completed by threading and tightening the bolt. Alternatively, the connector may be pre-built and attached to the upper and lower half-diamond coils in an almost "snap-on" configuration. Typically, the bolt will still need to be tightened to a proper torque.

Figure 7A:
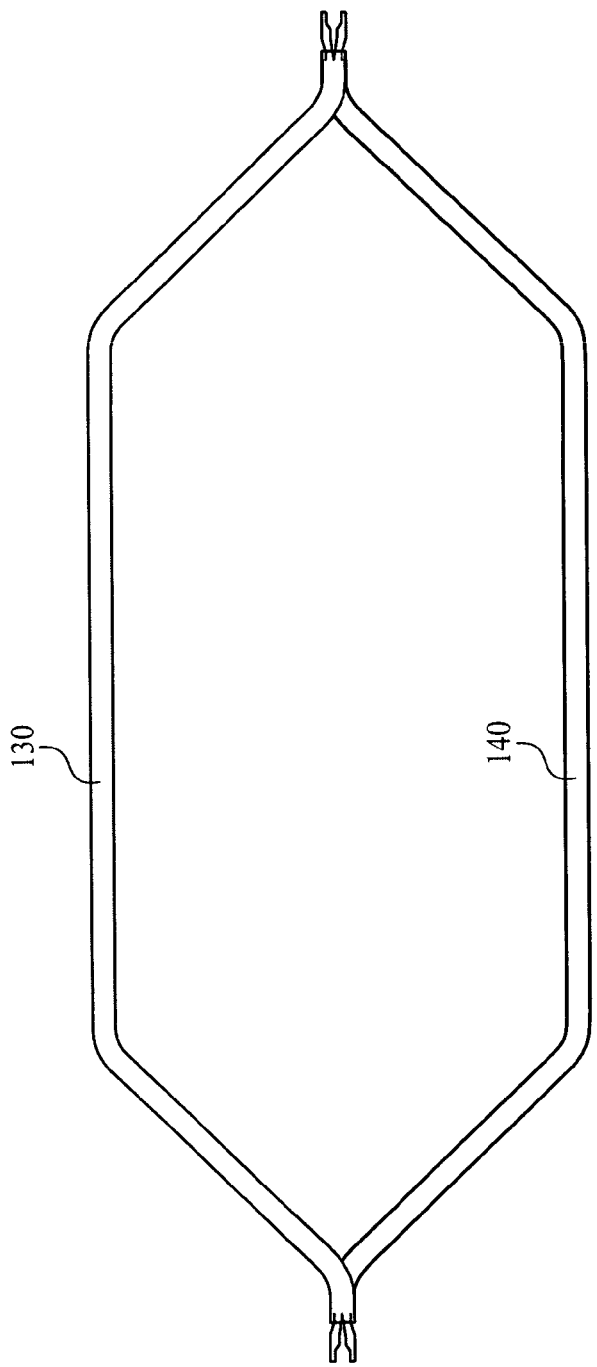
FIG. 7 depicts a top (7A) and side (7B) view of the upper and lower half-diamond coils combined to form a full-diamond coil, assembled according to the present invention.
Figure 7B:
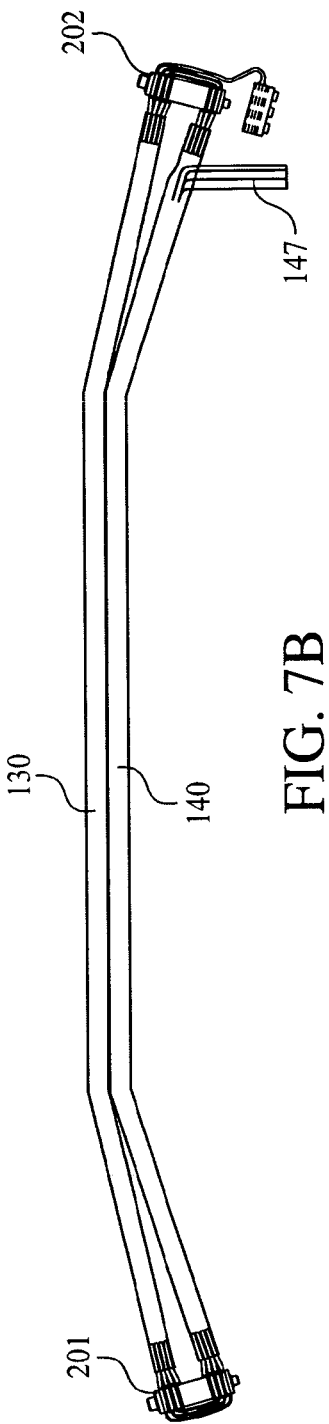

As referenced above, FIG. 7 shows top (7A) and side (7B) views of the upper 130 and lower 140 half-diamond coils connected together with bolted series connectors 200 (compare to the full-diamond coil of FIG. 3). When a connector 201 is connected to the left side of the half-diamond coils and a connector 202 (with phase lead 203) is connected on the right side of the half-diamond coils, the combined structure simulates a full-diamond coil (FIG. 3).

Figure 9:
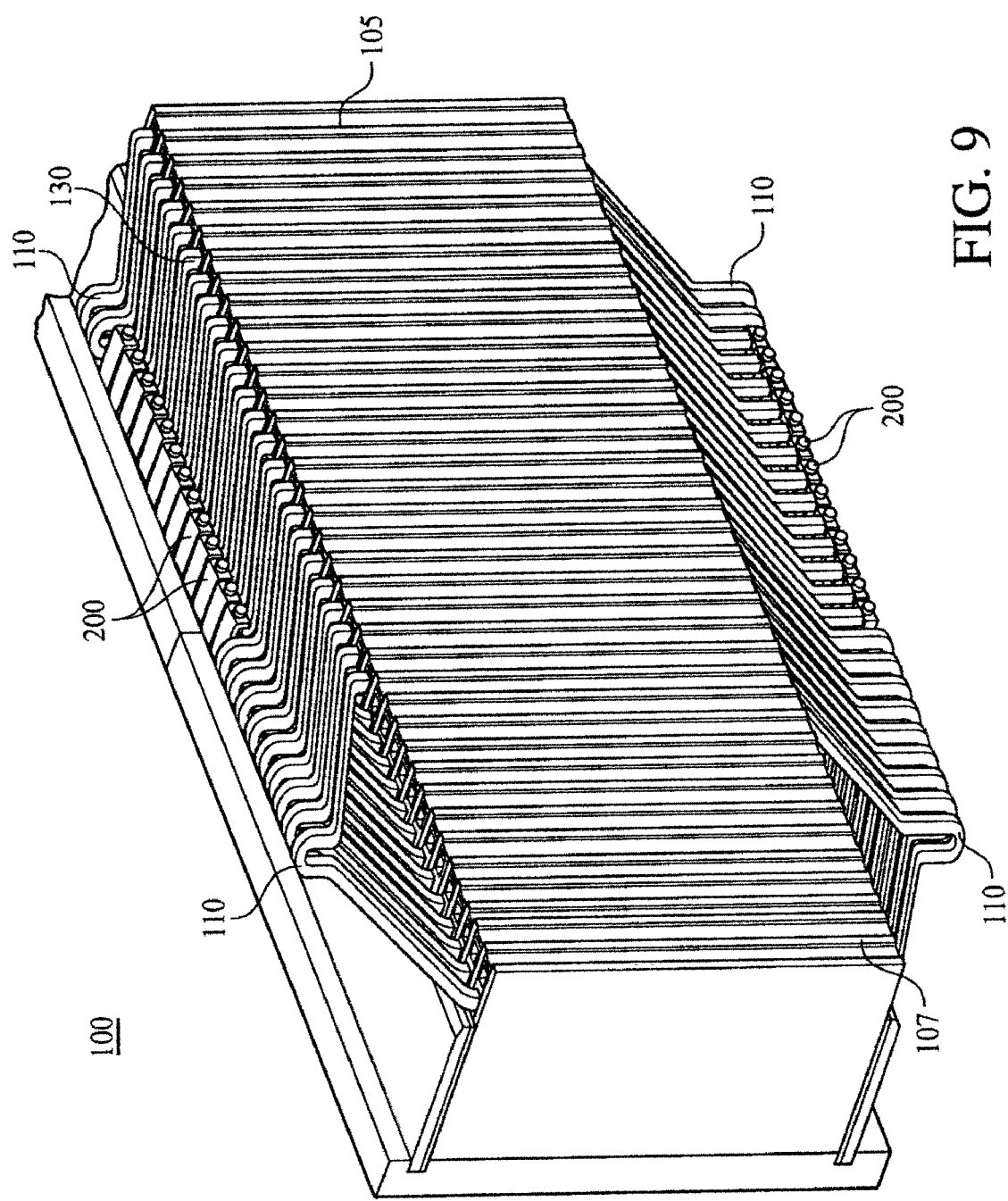
FIG. 9 depicts a two-section linear motor connected according to the present invention.

Further, FIG. 9 shows an isometric view of first 105 and second 107 stator sections connected together using the bolted series connectors 200 of the present invention (compare to FIG. 2). In FIG. 9, the connectors 200 are preferably four conductor connector 201 on one side and three conductor connector 202 (with phased lead) on the other side. The phase lead 203 may be a ferruled "I-beam" that allows for easy interconnection with leads 147 of subsequent coil sections.

Figure 10:
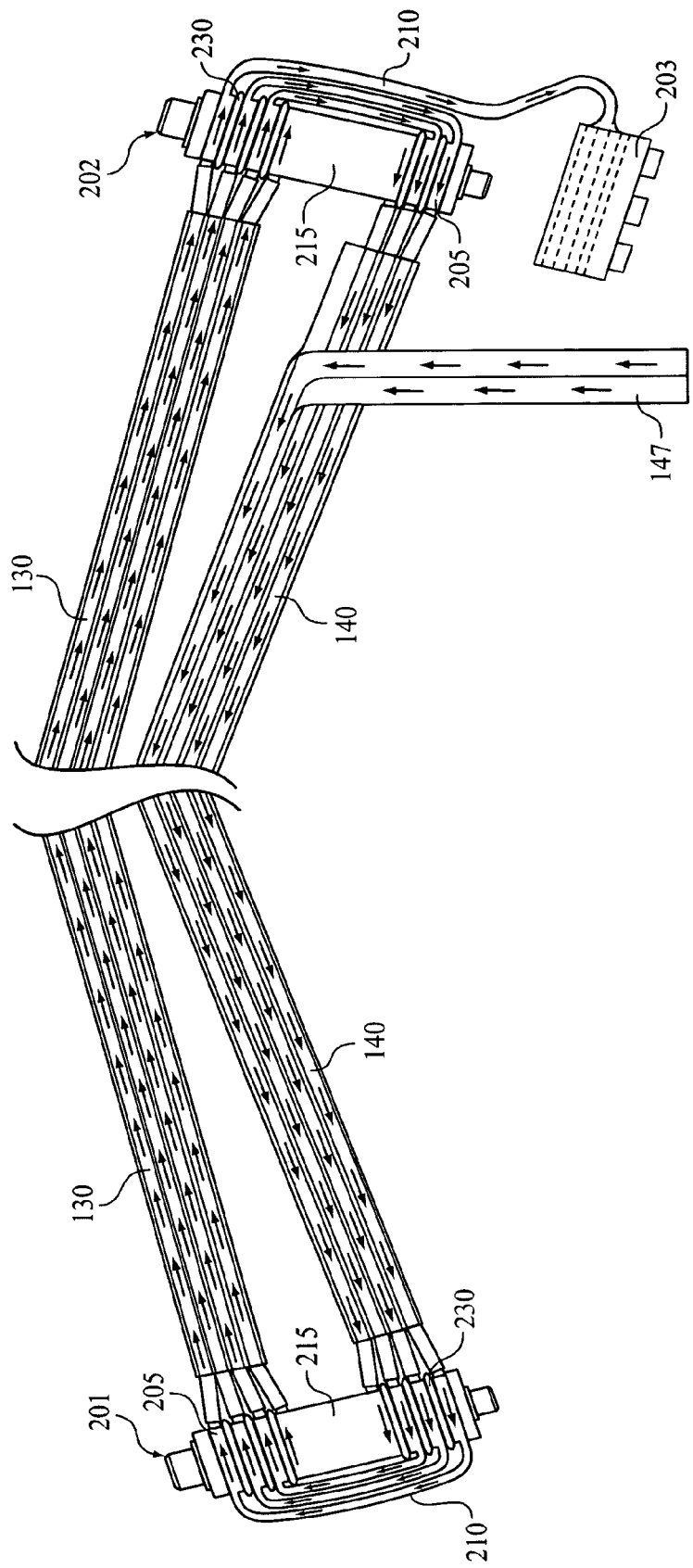
FIG. 10 is a current circuit depicting the flow of current through each of the coils in the machine.
Figure 11A:
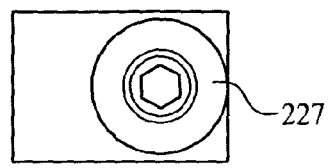
FIG. 11 depicts the assembly of exemplary bolted series connectors, including top (11A–11C), side (11D) and bottom (11E) views of a four conductor connector, and top (11F–11H), side (11I) and bottom (11J) views of a three conductor connector with phase lead.
Figure 11F:
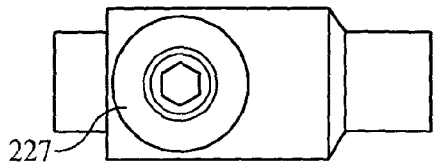
Figure 11B:
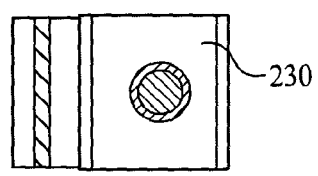
Figure 11G:
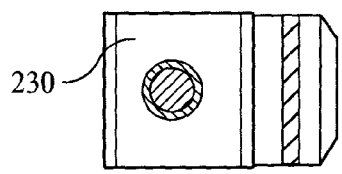
Figure 11C:
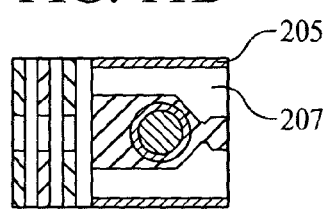
Figure 11H:
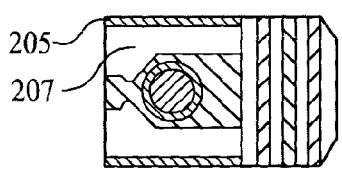
Figure 11D:
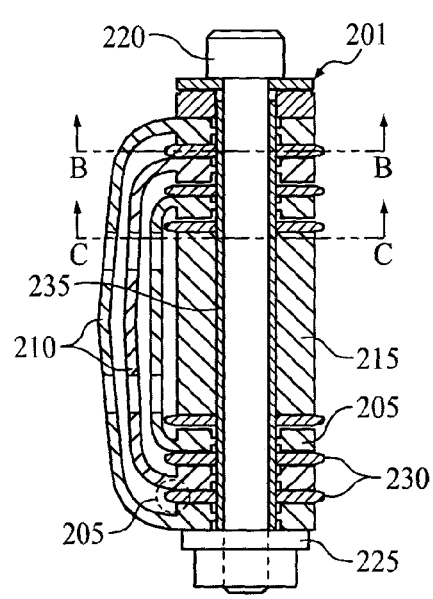
Figure 11I:
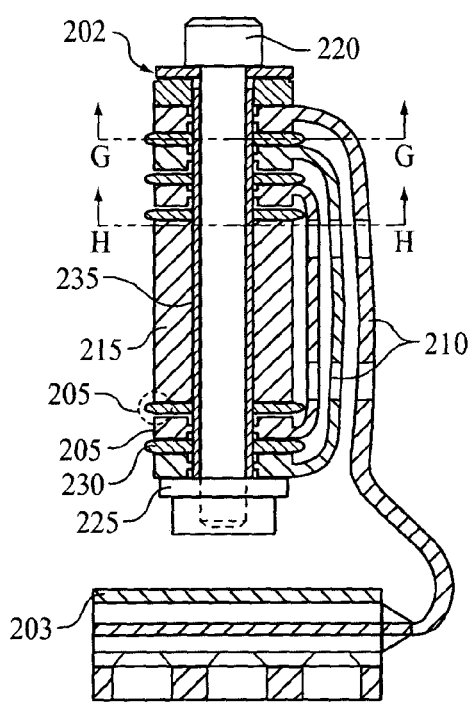
Figure 11E:
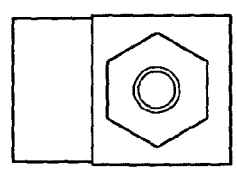
Figure 11J:
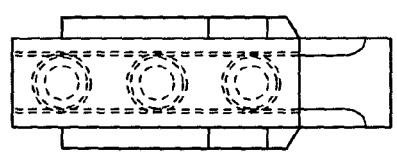

Finally, FIG. 10 includes a schematic drawing of current flow through the conductors of the upper 130 and lower 140 half-diamond coils when connected together using a bolted series connector 200 according to a preferred embodiment of the present invention. Note that the current enters the coil structure through leads 147, makes four clockwise circuits through the coil structure, and exits through phased lead 203 (to be connected to the next coil structure).

High efficiency electrical machines benefit from transposition of strand layers (conductor-pairs) within each phase group. As an alternative embodiment, a Roebel transposition could be incorporated into the aforementioned bolted series connector 200 shown in FIG. 11. For example, the crossover circuit could be incorporated into the outer layer jumper straps 210 and into the inner layer jumper block 215 according to conventional practices. An additional plane for the jumper straps 210 would be required. When viewed from FIG. 4, the top layer of strands in the upper half-diamond coil 130 would be connected to the second from the bottom layer of strands of the connecting lower half-diamond coil 140. The balance of the conductors would be connected in a comparable displacement pattern.

When properly fabricated and installed according to the above embodiment, the present invention provides a compact, compression-style bolted joint eliminating the need for semi-permanent metals joining processes such as welding, brazing, or soldering. Electrical separation spacing is maintained between components at different electrical potentials (e.g., in series windings). Conductive strands can be positively latched in place within the connector. Machine load requirements are easily met (e.g., a one-quarter inch diameter Grade 8 Carbon Steel bolt at 150 inch-pounds torque provides more than 10 times the 300 pound load required to safely conduct the 1553 amp coil current in common machines). A common G-10 insulator (used for dielectric washer and spacers in FIG. 11) provides mechanical creep (estimated over 50 years) that is less than the bolt is stretched. Belleville washers provide additional insurance against loss of contact pressure. A stainless steel self-locking heli-coil nut assures no bolt loosening. A high quality dielectric molded silicon rubber boot may be used to fully insulate each connector assembly.

These materials and designs allow for efficient assembly (virtually "snap-together" in some embodiments), disassembly, and maintenance of electrical machinery without the use of semi-permanent welded, brazed, soldered, riveted, and similar metals joining processes. They also facilitate connection of multiple electrical circuits using a single fastener and maintain electrical strike and creep integrity between electrical circuits of different voltage potentials. When compared to prior designs, the present invention also minimizes the physical space required to make single multi-strand connections and allows for the incorporation of electrical Roebel transpositions within the connector.

Note that the foregoing discussion was based on interconnection of half diamond coils consisting of four series turns (or layers) to satisfy the machine's voltage rating requirements, with each layer (conductor-pair) consisting of two parallel strands to satisfy the machine's current rating requirements (FIG. 4). However, the concept of the connector configuration is not restricted to this particular combination of coil layers or strand parallels.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A stator coil system, comprising:
an upper half-diamond coil with first and second machined tips;
a lower half-diamond coil with third and fourth machined tips, wherein said upper and lower half-diamond coils include a plurality of conductor pairs, each conductor pair being at a different potential;
a first mechanical-electrical connector adapted to receive the first and third machined tips from said upper and lower half-diamond coils and mechanically and electrically interconnect the upper and lower half-diamond coils; and
a second mechanical-electrical connector adapted to receive the second and fourth machined tips from said upper and lower half-diamond coils and mechanically and electrically interconnect the upper and lower half-diamond coils, wherein said first and second mechanical-electrical connectors each include a plurality of conductive layers, at least one dielectric layer physically separating the plurality of conductive layers and at least one strap conductor interconnecting said conductive layers, further wherein said first and second connectors are encased within an insulating boot.

2. The stator coil system of claim 1, wherein the number of said coil pairs is four.

3. The stator coil system of claim 1, wherein said first mechanical-electrical connector includes a first bolt running therethrough and said second mechanical-electrical connector includes a second bolt running therethrough.

4. The stator coil system of claim 3, wherein said first and third machined tips are aligned and adapted to receive said first bolt, and said second and fourth machined tips are aligned and adapted to receive said second bolt.

5. A stator coil system, comprising:
an upper half-diamond coil with first and second machined tips;
a lower half-diamond coil with third and fourth machined tips;
a first mechanical-electrical connector adapted to receive the first and third machined tips from said upper and lower half-diamond coils and mechanically and electrically interconnect the upper and lower half-diamond coils; and
a second mechanical-electrical connector adapted to receive the second and fourth machined tips from said upper and lower half-diamond coils and mechanically and electrically interconnect the upper and lower half-diamond coils,
wherein said upper and lower half-diamond coils include a plurality of conductor pairs, each conductor pair being at a different potential,
further wherein said first and second mechanical-electrical connectors include a plurality of conductive sections separated by at least one dielectric layer, said conductive sections connected to each other through a strap conductor, and
further wherein the first mechanical-electrical connector includes eight conductor sections which are interconnected through three conductive straps and an inner conductive block.

6. The stator coil system of claim 5, wherein the second mechanical-electrical connector includes seven conductor sections which are interconnected through three conductive straps and an inner conductive block.

7. The stator coil system of claim 6, wherein said second mechanical-electrical connector includes a phase lead.

8. The stator coil system of claim 7, further comprising:
a first rubber boot encasing said first connector; and
a second rubber boot encasing said second connector.

9. The stator coil system of claim 8, wherein said first and second rubber boots are filled with a dielectric paste.

10. The stator coil system of claim 6, wherein said conductive straps are connected in a Roebel transposition orientation.

11. The stator coil system of claim 10, wherein said first and second mechanical-electrical connectors include first and second Bellville washers and self-locking nuts, respectively.

12. A mechanical-electrical connector for interconnecting successive coil loops of a sectioned stator, comprising:
a first conductive layer;
a first dielectric layer below said first conductive layer;
a second conductive layer below said first dielectric layer;
a third conductive layer;
a second dielectric layer below said third conductive layer;

a fourth conductive layer below said second dielectric layer;

an inner conductor electrically joining said second and third conductive layers;

an outer conductive jumper electrically joining said first and fourth conductive layers; and a bolt running through each of said conductive layers, dielectric layers and inner conductor to secure said layers together.

13. The mechanical-electrical connector of claim 12, wherein each of said dielectric layers is larger than each of said conductive layers to prevent creep.

14. The mechanical-electrical connector of claim 12, wherein each of said four conductive layers includes a groove machined therein adapted to accept a conductive tip from an external source.

15. The mechanical-electrical connector of claim 14, further comprising:

a phase lead connected to said first conductive layer.

16. The mechanical-electrical connector of claim 15, further comprising:

an insulating tube around said bolt to insulate said bolt from said conductive layers.

17. The mechanical-electrical connector of claim 16, further comprising:

an insulating boot formed around said bolt and conductive layers.

18. The mechanical-electrical connector of claim 17, wherein said dielectric layers are made from G-10.

* * * * *